United States Patent Office.

SAMUEL LENHER AND HALLAM H. SPENCER, OF PHILADELPHIA, PENNSYLVANIA.

Letters Patent No. 97,528, dated December 7, 1869.

IMPROVED MODE OF PREPARING PAPER FOR PRINTING POSTAGE AND REVENUE-STAMPS.

The Schedule referred to in these Letters Patent and making part of the same.

*To all whom it may concern:*

Be it known that we, SAMUEL LENHER and HALLAM H. SPENCER, both of the city and county of Philadelphia, and State of Pennsylvania, have invented a certain new and useful Improvement in Preparing Paper for Printing Revenue and Postage-Stamps; and we do hereby declare that the following is a full, clear, and exact description thereof, which will enable others skilled in the art to which it appertains, to make and use our invention.

The object of our said invention is to prevent the restoration of cancelled stamps. This we accomplish by coating the paper, previously to printing, with a sizing, of which the essential ingredients are an earthy substance, which is insoluble in water, and easily decomposed by acids, and a glutinous substance, which serves to affix it to the paper.

We compound this preparation of one pound of carbonate of lime, carbonate of baryta, carbonate of magnesia, or other earth which is insoluble in water, and easily decomposed by acids, carbonic-acid gas being readily eliminated, to which earthy "body," we add an ounce and a half of glue, two ounces of gum-arabic, dextrine, or other gum, which is readily soluble in water, and one quart of water.

We do not confine ourselves to the precise proportions given, as they may be slightly varied without substantially affecting the nature of the composition; but we state those proportions which we have found to be most advantageous in practice. We would also state that the gumming-ingredient may be dispensed with, as it is not essential either to the adhesiveness of the size, nor to its ready disintegration, but we prefer to use it, as it renders the sizing more soluble.

To compound the ingredients above named, we dissolve the glue or gum and glue in the water, which we heat until either or both are dissolved, and then stir in the earthy "body" till it is thoroughly mixed.

When the mixture is perfectly smooth and of uniform consistency, we apply it to the paper in any convenient way, laying it on with a brush, or by means of the machinery commonly employed for coating wall-paper. When the paper thus prepared has been slightly dampened, it is ready for printing.

The stamp having been cancelled, whether with printers' ink, writing-fluid, or any other ink, should it be attempted to obliterate the mark of cancellation by means of an acid, the chemical action of the acid on the earthy body, eliminating the carbonic-acid gas, will decompose the size, and consequently efface the print.

If the attempt be made with other substances, such as water or alkalies, the glutinous and gummy ingredients will be dissolved, not only by chemical action, but also by the mechanical action necessary to efface the mark, so that, in any event, the mark of cancellation cannot be removed without disintegrating the size and thereby defacing the print.

We do not claim printing a stamp on sizing interposed between the printing-ink and the paper, as we are aware that that is a well-known process; but What we do claim as our invention, and desire to secure by Letters Patent of the United States, is—

1. The preparation, compounded of the ingredients specified, and for the purpose set forth.

2. A preparation for printing postage or revenue-stamps upon, and from which the mark of cancellation cannot be effaced, without disintegrating such preparation, either by chemical action alone, or by chemical and mechanical action combined, substantially in the manner described.

SAMUEL LENHER.
H. H. SPENCER.

Witnesses:
GEORGE E. BUCKLEY,
WILLIAM J. BURNS.